United States Patent
Xu et al.

(10) Patent No.: US 9,326,416 B1
(45) Date of Patent: Apr. 26, 2016

(54) STORAGE SERVER

(71) Applicants: INVENTEC (PUDONG) TECHNOLOGY CORPORATION, Shanghai (CN); INVENTEC CORPORATION, Taipei (TW)

(72) Inventors: Ji-Peng Xu, Shanghai (CN); Jia-Bin Wang, Shanghai (CN)

(73) Assignee: INVENTEC (PUDONG) TECHNOLOGY CORPORATION, Taipei (TW)

(*) Notice: Subject to any disclaimer, the term of this patent is extended or adjusted under 35 U.S.C. 154(b) by 0 days.

(21) Appl. No.: 14/614,415

(22) Filed: Feb. 5, 2015

(30) Foreign Application Priority Data

Nov. 21, 2014 (CN) .......................... 2014 1 0674570

(51) Int. Cl.
*H05K 7/20* (2006.01)
*H05K 7/14* (2006.01)
*H05K 7/18* (2006.01)

(52) U.S. Cl.
CPC ............ *H05K 7/1489* (2013.01); *H05K 7/1492* (2013.01); *H05K 7/183* (2013.01)

(58) Field of Classification Search
CPC .......................... H05K 7/1489; H05K 7/1492
See application file for complete search history.

(56) References Cited

U.S. PATENT DOCUMENTS

| | | | | |
|---|---|---|---|---|
| 2002/0196601 A1* | 12/2002 | Lee | ...................... | G11B 33/125 361/679.33 |
| 2010/0265650 A1* | 10/2010 | Chen | ...................... | G06F 1/183 361/679.33 |
| 2013/0141863 A1* | 6/2013 | Ross | .................... | G11B 33/128 361/679.33 |
| 2014/0312750 A1* | 10/2014 | Elison | ...................... | H05K 3/32 312/236 |
| 2015/0192970 A1* | 7/2015 | Jau | .......................... | G06F 1/187 361/679.33 |

* cited by examiner

*Primary Examiner* — Anthony Q Edwards
(74) *Attorney, Agent, or Firm* — Mark M. Friedman

(57) ABSTRACT

A storage server is provided herein, which comprises a chassis and at least one slide tray having at least one storage module. The advantage of the present invention is on expanding an accommodating space of the slide tray whereby various components can be disposed within the slide tray.

8 Claims, 6 Drawing Sheets

STORAGE SERVER

TECHNICAL FIELD OF THE INVENTION

The present invention relates to a server technology, and more particularly, to a storage server.

BACKGROUND OF THE INVENTION

A server is a high-performance computer in a network environment, which detects services requested by other computers (client ends) in the network and provides corresponding services. The configuration of the server is basically similar to a micro-electromechanical apparatus, including, for example, a processor, a storage device, a memory, and a system bus, and etc. A typical server is configured to execute many kinds of functions. For example, the server might be configured to be a file server, a print server, an application database server or a web server, or even functional combination thereof in a server. Such a server is necessary to have a fast processing chip, more memory (RAM), and sufficient inner disk space for meeting the deployment requirements that end users may request at any time.

As coming with the age of big data, the demands for storage devices in the server is higher and higher, and therefore more powerful storage capacity is required to satisfy the demands. A server providing multiple services usually has at most five inner disks. However, a storage server has at least six inner disks, and most of time has twelve to twenty four disks. The density of hard disks is higher and higher.

However, as the demands for the capacity of the storage server are increased, the demands for density, deployment, and heat dissipating are higher and higher. Conventional storage servers can not satisfy these demands.

SUMMARY OF THE INVENTION

In order to solve above problems existing in the conventional skills, a primary objective of the present invention is to provide a storage server, which possesses a high density of hard disks, rational deployment, and better heat dissipating.

To achieve above objective, the present invention provides a storage server, suitable for installing in a case, the storage server comprising a chassis and at least one slide tray, the at least one slide tray located inside the chassis and being stacked and overlapped with each other, each slide tray being electrically connected to a power supply at a back end of the storage server via a first cable, the at least one slide tray comprising: at least one storage module disposed along two opposite sides of the slide tray and extended from a rear end to a front end of the slide tray, the storage module comprising: a storage backplane disposed on the slide tray; and two pairs of storage units back-to-back aligned with each other and electrically connected to the storage backplane, the respective storage unit being individually plugged into or pulled out from the storage backplane; at least one thermal dissipation module disposed at a front portion of the slide tray and located at a front end of the storage module; an transfer board disposed at a front portion of a channel located between the at least storage module at the two opposite sides of the slide tray, the transfer board being electrically connected to the storage backplane via a second cable and electrically connected to the thermal dissipation module via a third cable; a circuit board plugged into or pulled out from the transfer board at a front end of the channel and electrically connected to the transfer board, the circuit board comprising at least one connector, the storage server expanding its storage capacity by interconnecting the at least one connector with each other, and the storage server being connected to an external server via the at least one connector for expanding a storage capacity of the external server; and a power backplane disposed at a rear portion of the channel and electrically connected to the storage units via a fourth cable.

In one embodiment of the present invention, the slide tray comprises two baffles disposed at two sides of the channel, for separating the storage modules at the two sides thereof, whereby the channel accommodates the second cable and the fourth cable.

In one embodiment of the present invention, the slide tray comprises a front window, the thermal dissipation module is located on an inner side of the front window, and the front window has a plurality of vents located corresponding to the thermal dissipation module.

In one embodiment of the present invention, the slide tray comprises two latch handles disposed on the two sides of the front portion of the slide tray, each of the latch handles comprises a shifting portion, a first fastening portion, and a handle portion, the chassis has a first opening hole relative to the first fastening portion, when the slide tray sliding into the chassis is at a first position, the first fastening portion is fixed to the first opening hole such that the slide tray is fastened in the chassis, when moving the shifting portion, the first fastening portion is linked to escape from the first opening hole, whereby the slide tray is removed from the chassis.

In one embodiment of the present invention, the chassis comprises a U-shaped handle and a spring plate, the spring plate has a second fastening portion, when the storage server slides into the case, the second fastening portion is fixed to a second opening hole of the case such that the storage server is fastened in the case, and when the spring plate is pressed or pushed, the second fastening portion of the spring plate escapes from the second opening hole such that the chassis is removed from the case.

In one embodiment of the present invention, the chassis has at least one damper fastened on two outer sides thereof and penetrating the chassis to form an interference with a slide rail at a lateral surface of the slide tray, whereby the slide tray slowly moves in or out from the chassis when the slide tray is pushed or pulled out from the chassis.

In one embodiment of the present invention, the damper is spaced apart from a front end of the chassis for a first distance.

In one embodiment of the present invention, the chassis comprises a partition plate disposed between the upper and lower slide trays and separating the chassis into two chambers so that the slide trays slide in or out from the chambers respectively, and the first cable is freely stretched at a bottom surface of the chamber when the slide tray slides in or out from the chamber.

As described above, the advantages of the present invention are that the accommodating space of the slide tray is expanded whereby various components can be disposed within the slide tray, the deployment is rational, the density of hard disks is high, and heat is dissipated quite well. In addition, the storage server expands its storage capacity by using a connector, and the storage server is connected to an external server via the connector for expanding the storage capacity of the external server.

DETAILED DESCRIPTION OF THE INVENTION

A storage server provided in the present invention is detailedly described with specific embodiments as follows in conjunction with the appending drawings.

Figure 1:
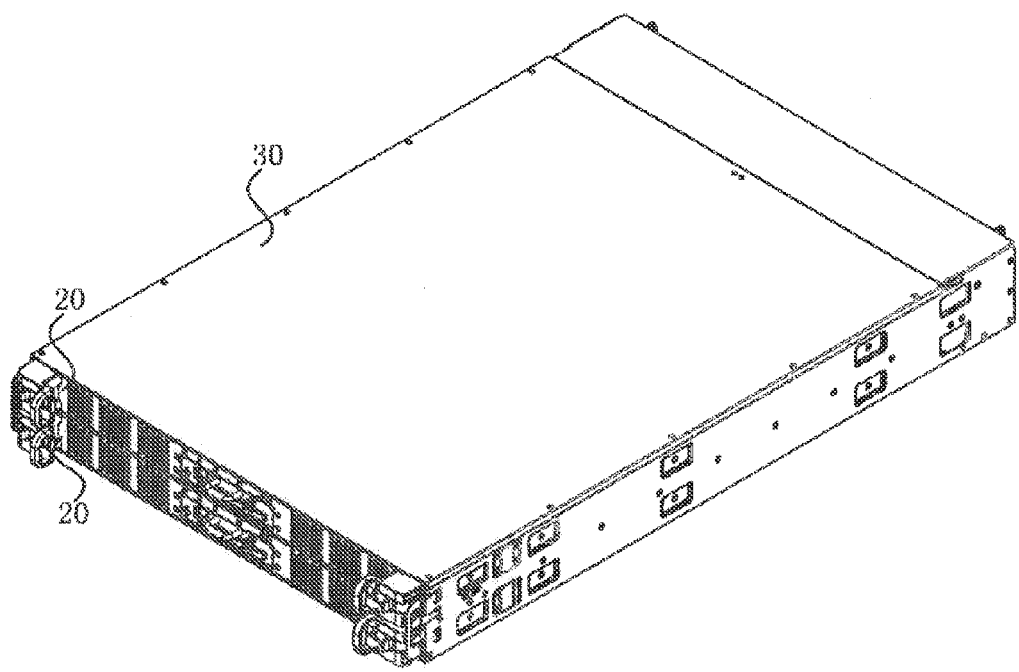
FIG. 1 is a schematic structural diagram showing an appearance of a storage server in accordance with the present invention.
Figure 2:
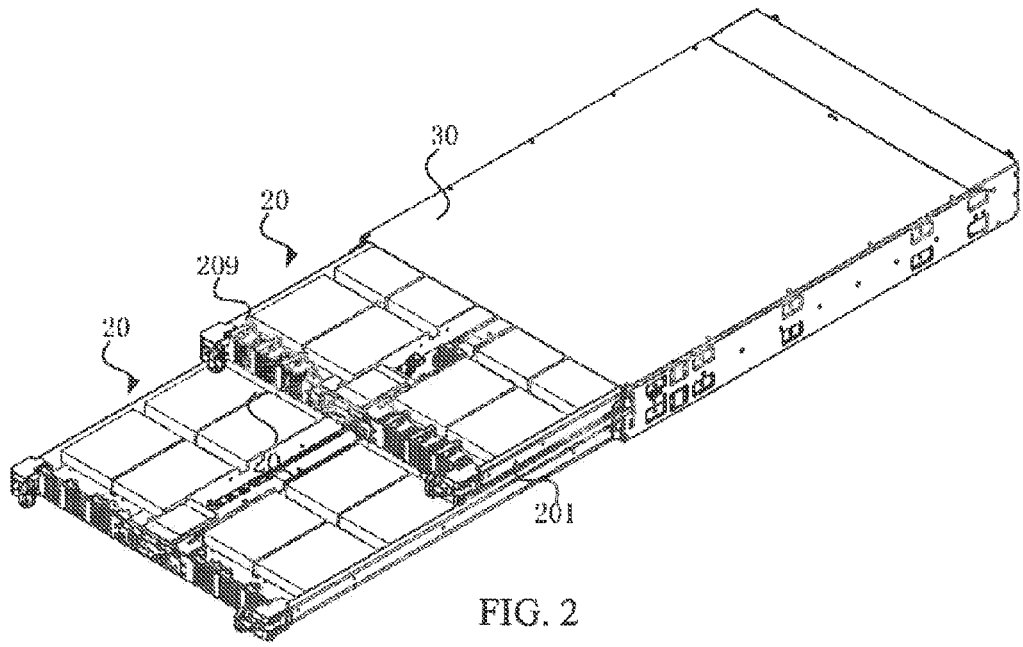
FIG. 2 is a schematic structural diagram showing a drawn slide tray of the storage server in accordance with the present invention.

Referring to FIG. 1 and FIG. 2, a storage server is suitable for installing in a case (not labelled in the drawings). The storage server comprises a chassis 30 and at least one slide tray 20.

The slide trays 20 are stacked and overlapped with each other, and are disposed inside the chassis 30. In other embodiments of the present invention, there can dispose any number of slide trays 20 depending on a user's demands, and all of the slide trays 20 are overlapped and stacked. Each of the slide trays 20 is connected to a power supply 34 (see FIG. 5) at back end of the storage server via a first cable 40. The chassis 30 has guide rails (not labelled in the drawings) disposed on two opposite inner walls thereof. Each of the slide trays 20 comprises a bracket 209. The bracket 209 has tray slide rails 201 disposed on two opposite outer walls thereof. The tray slide rails 201 cooperate with the guide rails, whereby the slide trays 20 can be drawn from the chassis 30 and the slide trays 20 are provided with support. In such a manner, all of the slide trays 20 are positioned and maintain parallel to each other Referring to FIG. 3 to FIG. 6, each slide tray 20 further comprises at least one storage module 202, a thermal dissipation module 207, an transfer board 204, a circuit board 210, and a power backplane 205.

The storage modules 202 are disposed along two opposite sides of the slide tray 20, extending from a back end to a front end. In the present embodiment, each of the slide trays 20 comprises four storage modules 202. The four storage modules 202 are in pairs and each pair is at the same side. The four storage modules 202 are disposed at the two opposite sides of the slide tray 20. The bracket 209 is used to accommodate the storage modules 202.

Each of the storage modules 202 comprises at least one storage backplane 221 and two pairs of storage units 203. The storage backplane 221 is disposed on the slide tray 20. The storage units 203 are back-to-back aligned with each other and are electrically connected to the storage backplane 221. Each of the storage units 203 can be plugged into and pulled out from the storage backplane 221, individually.

Figure 5:
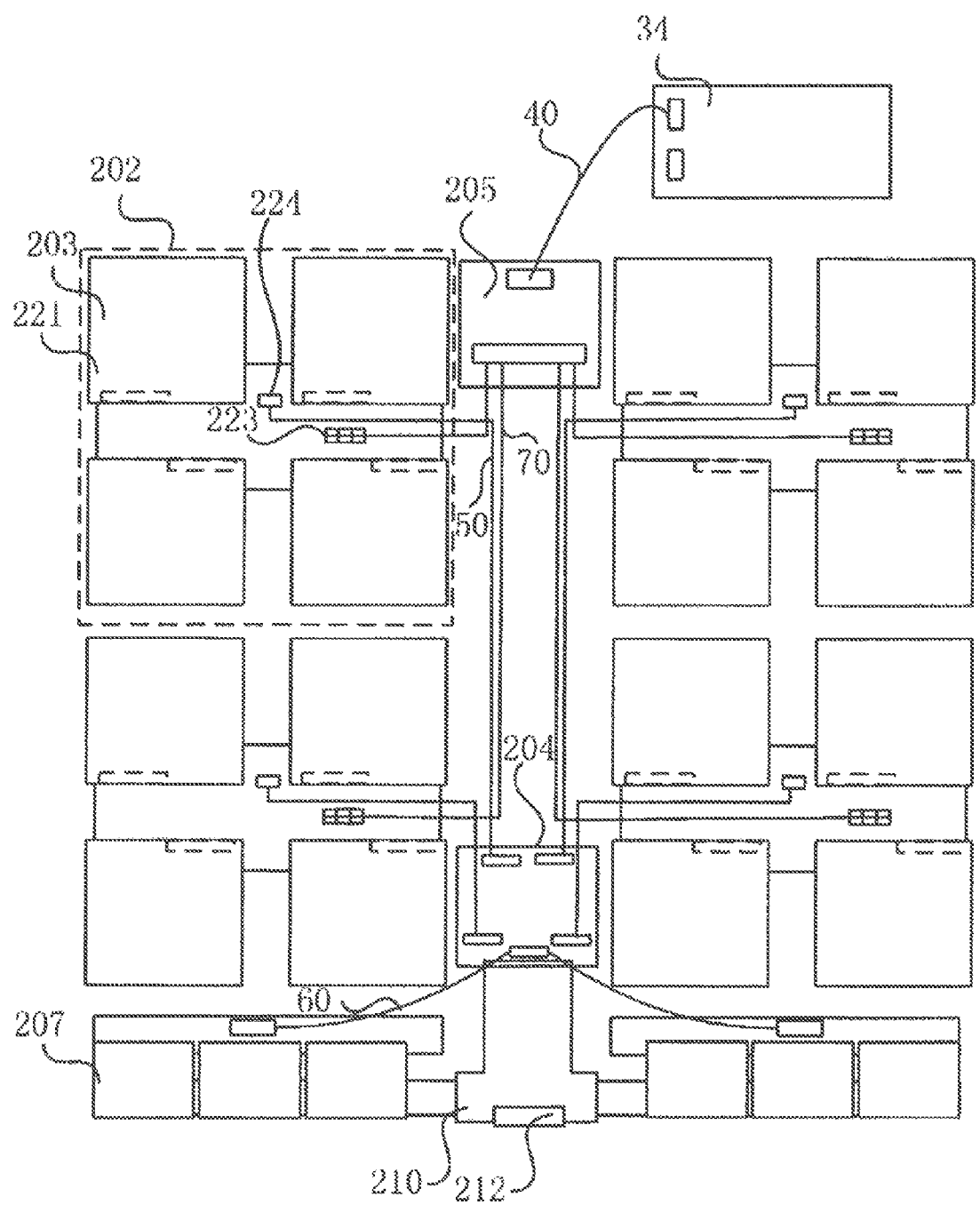
FIG. 5 is a block diagram showing the slide tray in accordance with the present invention.
Figure 6:
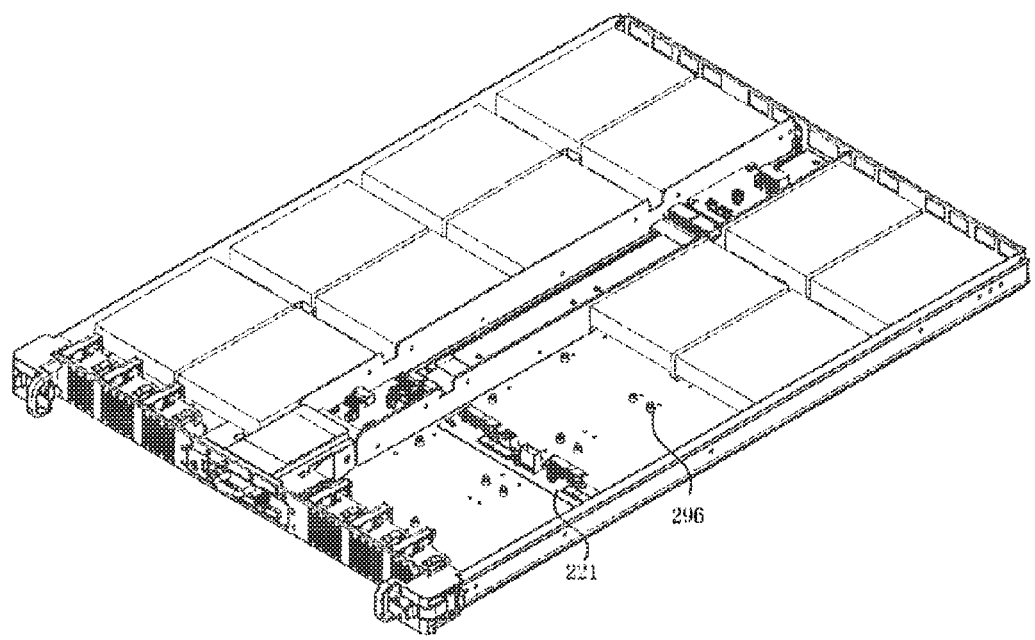
FIG. 6 is a schematic structural diagram showing the slide tray with four hard disks removed in accordance with the present invention.
Figure 7:
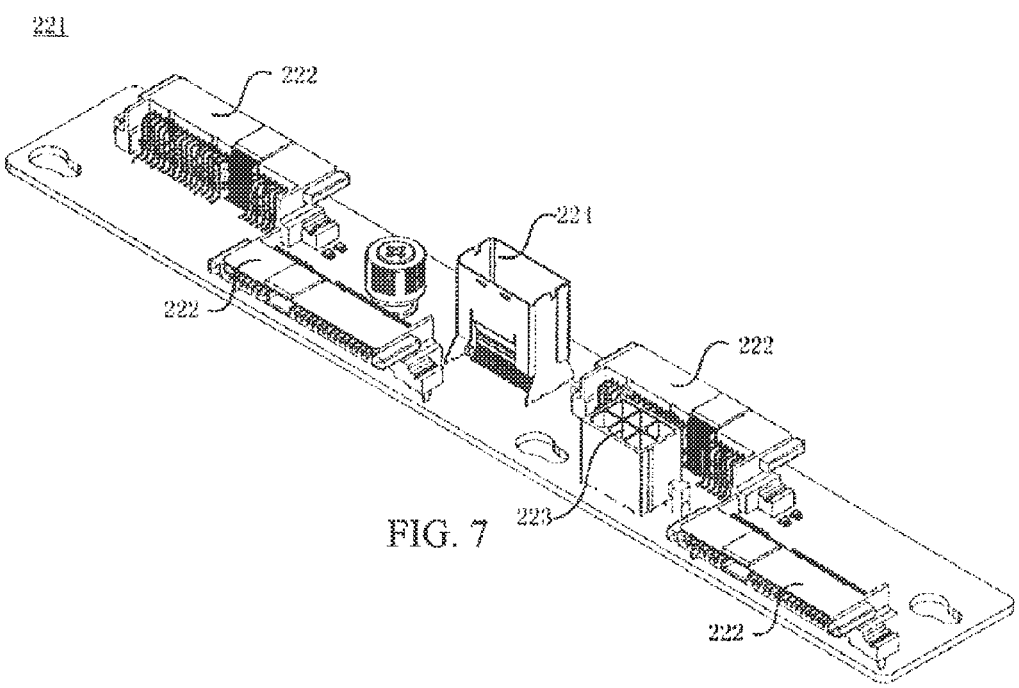
FIG. 7 is a schematic structural diagram showing a storage backplane in accordance with the present invention.

Referring to FIG. 5 and FIG. 7, each of the storage backplanes 221 has at least two pairs of storage unit ports 222 disposed thereon. Each of the storage unit ports 222 is used for insertion of a corresponding storage unit 203. The insertion direction for each storage unit port 222 is approximately parallel to the top surface of the storage backplane 221. Further, the at least two pairs of the storage unit ports 222 are back-to-back aligned with each other whereby the storage units 203 inserting into the storage unit ports 222 are also back-to-back aligned with each other. It is noted that such a back-to-back alignment indicates that the insertion directions for two storage units 203 are opposite to each other when the two storage units 203 are inserted into the storage unit ports 222 which are back-to-back aligned with each other.

Further, after each storage unit 203 is connected with the storage unit port 222, each storage unit 203 exceeds a corresponding length of the storage backplane 221 and a part of each storage unit 203 is exposed from the storage backplane 221, whereby it is helpful to dissipate heat from the storage unit 203 and elongate the service life of the storage unit 203, thereby improving the performance of the storage server.

Further, two storage unit ports 222 with back-to-back alignment form an alternating arrangement. The advantage of the alternating arrangement is that the insertion locations where the storage units 203 engage with the two storage unit ports 222 in back-to-back alignment are the same. Accordingly, it is not necessary to pick the insertion locations of the storage units 203 and the storage unit ports 222 for inserting the storage units 203 into the storage unit ports 222. An arbitrary storage unit 203 can be inserted into any storage unit port 222, thereby saving time in mounting the storage unit 203 and improving the efficiency.

Referring to FIG. 7, each of the storage backplanes 221 further comprises a signal transmission interface 224. The signal transmission interface 224 is used to connect with the transfer board 204 (as labeled in FIG. 5) for signal transmission. Each storage backplane 221 further comprises a power socket 223. The power socket 223 is used to connect with the power backplane 205 (as labeled in FIG. 5) whereby the power backplane 205 supplies power to each storage unit 203.

Figure 4:
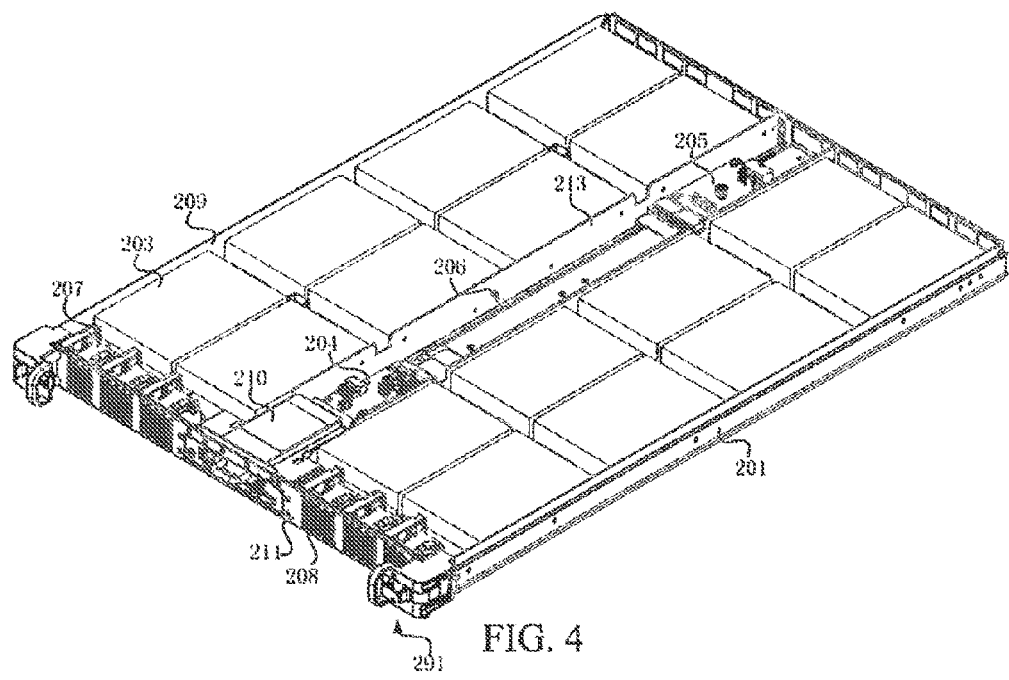
FIG. 4 is a schematic structural diagram showing a slide tray in accordance with the present invention.

Referring to FIG. 4, the thermal dissipation modules 207 are disposed at a front portion of the slide trays 20 and located at a front end of all the storage modules 202. The thermal dissipation modules 207 are used to dissipate heat for each of the slide trays 20. The thermal dissipation modules 207 belong to a redundancy design. Any one of the thermal dissipation modules 207 has malfunctioned whereas the other thermal dissipation modules 207 can still work. Accordingly, due to a malfunction in one single thermal dissipation module 207, overheating of the storage units 203 is avoided. The thermal dissipation modules 207 are connected to the transfer board 204 via a third cable 60 such that controlling the thermal dissipation modules 207 by the storage server is carried out. Further, the slide tray 20 comprises a front window 211. The thermal dissipation modules 207 are located at an inner side of the front window 211. The front window 211 has a plurality of vents located corresponding to the thermal dissipation modules, thereby facilitating heat exchanging.

Referring to FIG. 4 and FIG. 5, the slide tray 20 has a channel 206 located between the storage modules 202 at two opposite sides of the slide tray 20. The transfer board 204 is disposed at a front portion of the channel 206. The transfer board 204 is electrically connected to all the storage backplanes 221 via a second cable 50. That is, the transfer board 204 is electrically connected to the signal transmission interfaces 224 of the storage backplanes 221. The transfer board 204 is further electrically connected to the thermal dissipation modules 207 via a third cable 60.

Referring to FIG. 5, the circuit board 201 is plugged into or pulled out from the transfer board 204 at a front end of the channel 206. The circuit board 201 is electrically connected to the transfer board 204. The circuit board 210 may be connected to the transfer board 204 through gold finger terminals. The circuit board 210 comprises at least one connector 212. The storage server expands its storage capacity by interconnecting the connectors 212 with each other. Also, the storage server is connected to an external server via the connector 212 for expanding a storage capacity of the external server.

Referring to FIG. 4 and FIG. 5, the power backplane 205 is disposed at a rear portion of the channel 206. The power backplane 205 is connected to all the storage units 203 via a fourth cable 70 for supplying power to all the storage units 203. The power backplane 205 of each slide tray 20 is connected to the power supply 34 at a rear end of the storage server via a first cable 40. The power supply 34 is connected to an external power source for supplying power to the storage server.

Referring to FIG. 4, the slide tray 20 comprises two baffles 213. The baffles 213 are disposed at two sides of the channel 206, for separating the storage modules 202 at the two sides thereof, whereby the channel 206 forms an accommodating space for accommodating the second cable 50 and the fourth cable 70. Further, the baffles 213 of the channel isolate the regions at two sides of the channel 206 such that heat dissipating of the regions at the two sides of the channel 206 is along air passage of their own fans without interference. In addition, there is no fan disposed at a front end of the channel 206 where a demand for heat dissipating is low.

Figure 3:
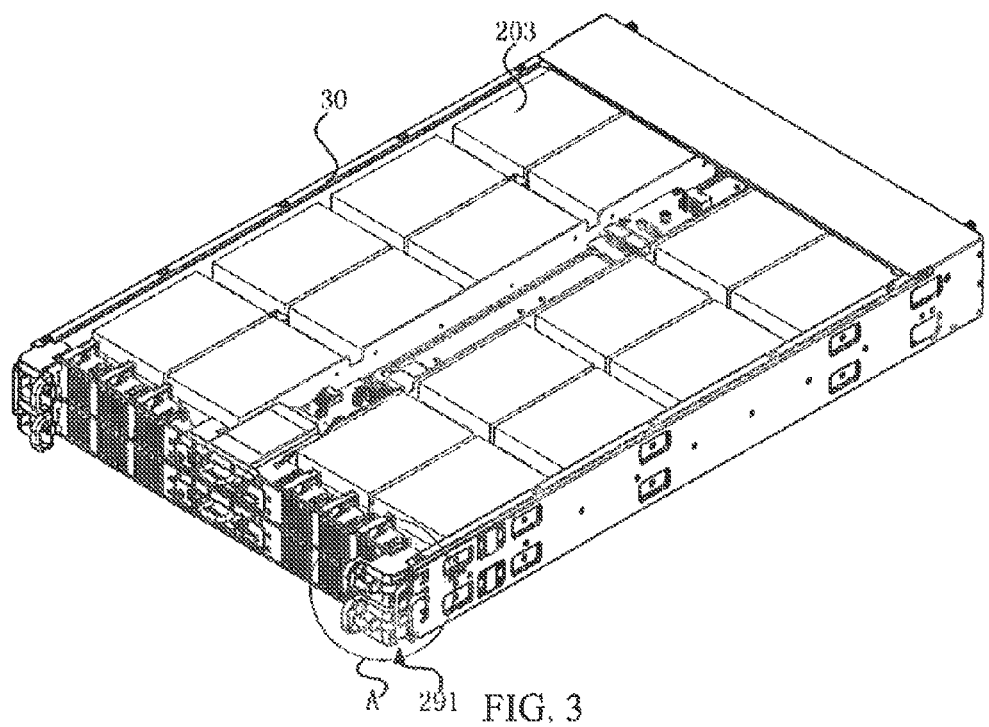
FIG. 3 is a top view of the storage server with an upper chassis cover removed in accordance with the present invention.
Figure 8:
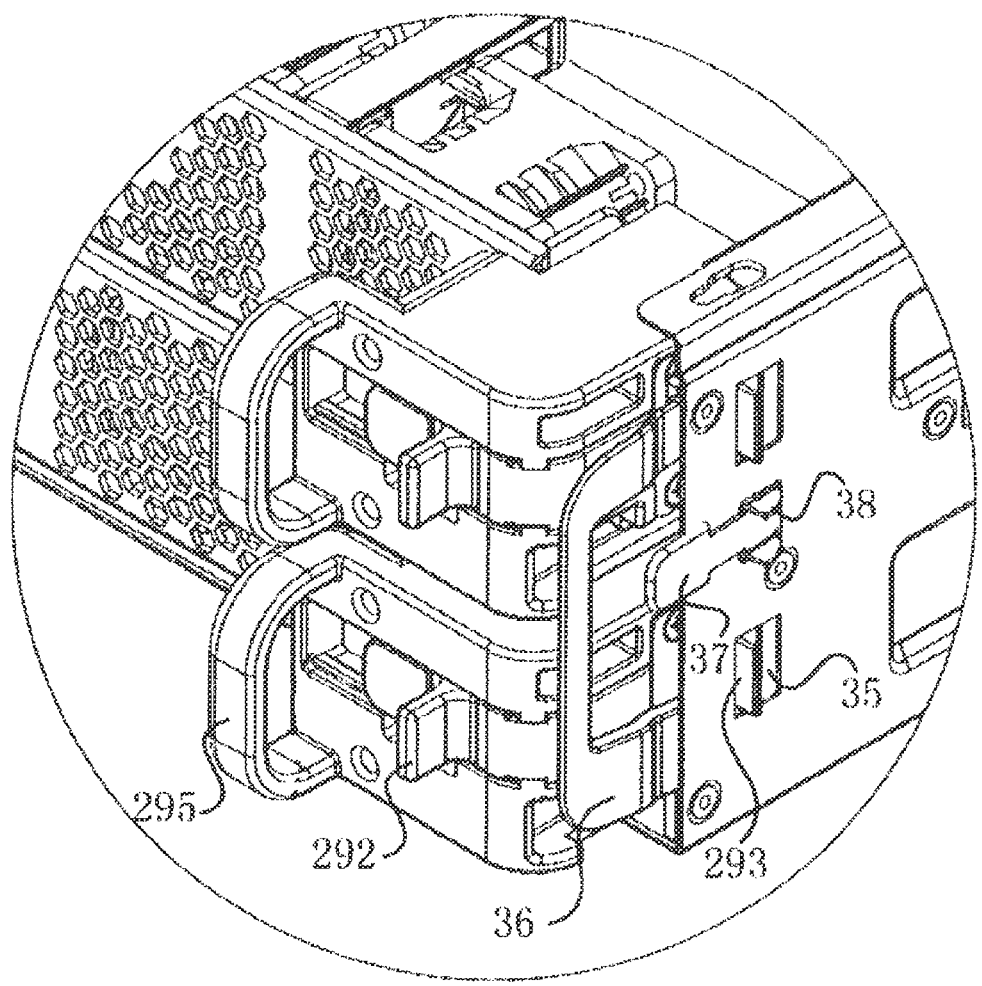
FIG. 8 is an enlarged view of a portion A shown in FIG. 3.

Please refer to FIG. 3 and FIG. 8. FIG. 8 is an enlarged view of a portion A shown in FIG. 3. The slide tray 20 comprises two latch handles 291. The latch handles 291 are used to engage the slide tray 20 with the chassis 30 or disengage the slide tray 20 from the chassis 30. Each latch handle 291 comprises a shifting portion 292, a first fastening portion 293, and a handle portion 295. The chassis 30 has a first opening hole 35 disposed relative to the first fastening portion 293. When the slide tray 20 sliding into the chassis 30 is at a first position, the first fastening portion 293 is fixed to the first opening hole 35 such that the slide tray 20 is fastened in the chassis. When moving the shifting portion 292, the first fastening portion 293 is linked to escape from the first opening hole 35, whereby the slide tray 20 is removed from the chassis 30.

Referring to FIG. 3 and FIG. 8, the chassis 30 comprises a U-shaped handle 36 and a spring plate 37. The spring plate 37 has a second fastening portion 38. When the storage server slides into the case, the second fastening portion 38 is fixed to a second opening hole (not labelled in the drawings) of the case such that the storage server is fastened in the case. When the spring plate 37 is pressed or pushed, the second fastening portion 38 of the spring plate 37 escapes from the second opening hole such that the chassis 30 is removed from the case.

Figure 9:
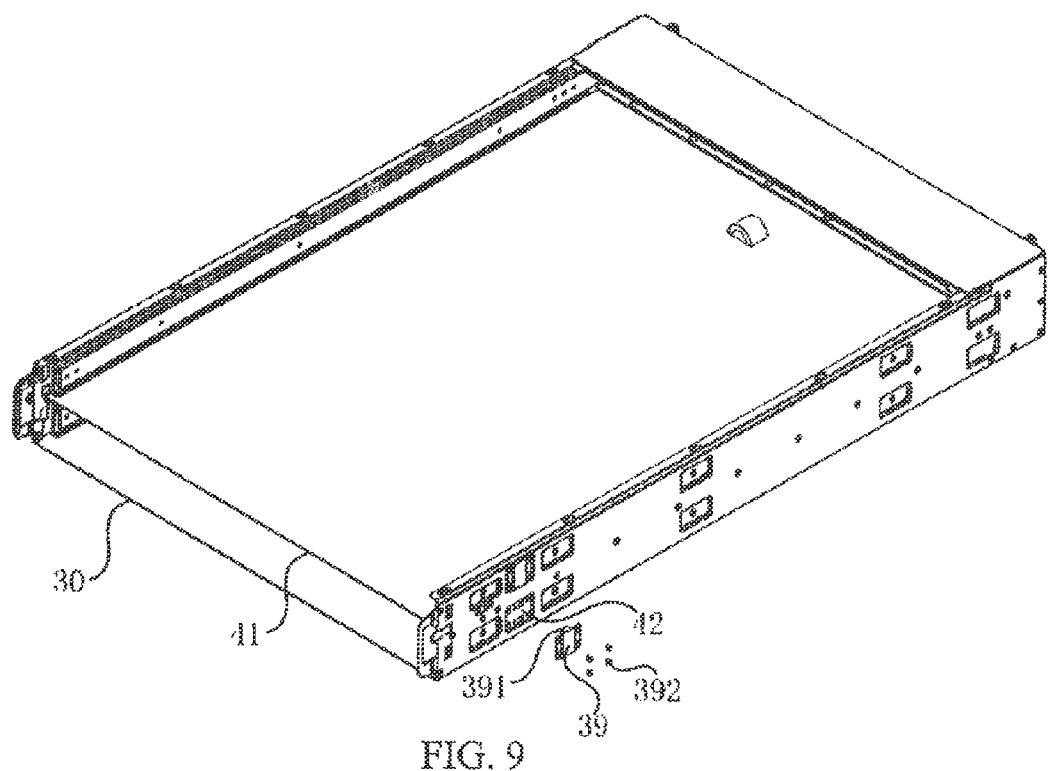
FIG. 9 is a schematic structural diagram showing the storage server with the slide tray removed in accordance with the present invention.

Referring to FIG. 9, at least one damper 39 is fastened on two outer sides of the chassis 30. The damper 39 penetrates an opening 42 of the chassis 30 and interferes for a certain degree with a slide rail 201 at the lateral surface of the slide tray 20, whereby the slide tray 20 slowly moves in or out from the chassis 30 when the slide tray 20 is pushed or pulled out from the chassis 30. In the present embodiment, a friction block 391 is disposed on a face of the damper 39 facing the slide tray 20. The friction block 391 interferes for the aforesaid degree with the slide rail 201 at the lateral surface of the slide tray 20. The damper is fastened on the chassis 30 by screws 392. Further, the damper 39 is spaced apart from a front end of the chassis 30 for a first distance.

Referring to FIG. 9, the chassis 30 comprises a partition plate 41. The partition plate 41 is disposed between the upper and lower slide trays 20. The partition plate 41 separates the chassis 30 into two chambers. The slide trays 20 slide in or out from the chambers, respectively. The first cable 40 is freely stretched at a bottom surface of the chamber when the slide tray 20 slides in or out from the chamber.

Figure 10:
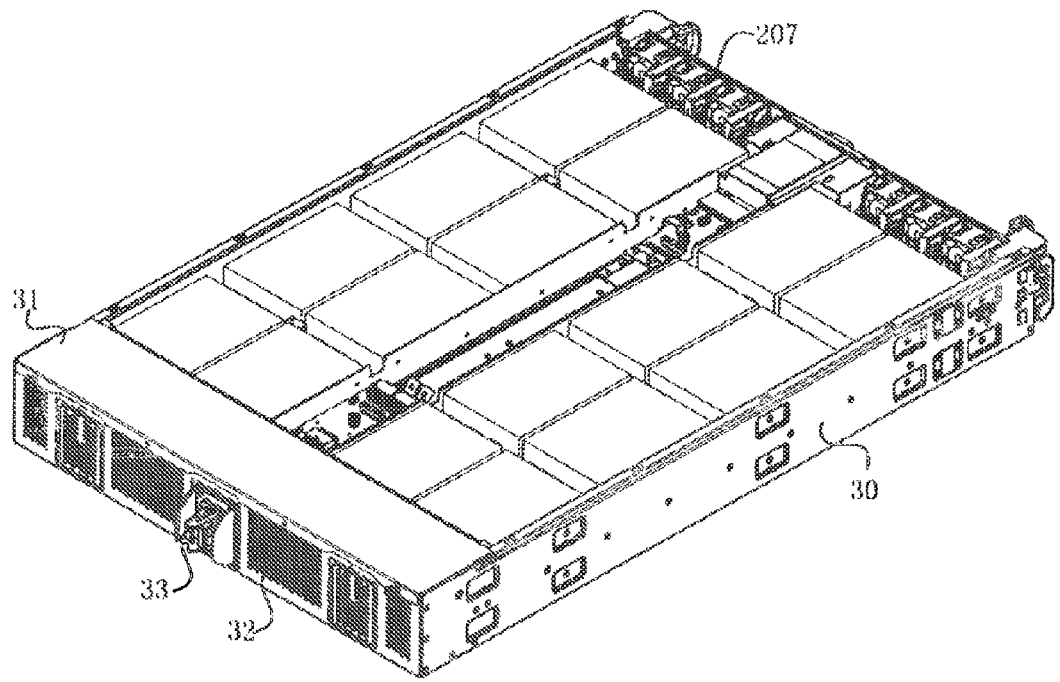
FIG. 10 is another top view of the storage server with an upper chassis cover removed in accordance with the present invention.

Referring to FIG. 10, the chassis 30 has a chamber 31 disposed at a rear portion thereof. The chamber 31 is used to accommodate components of the storage server, for example, the power supply 34 (as labelled in FIG. 5). Further, the chassis 30 has a piercing structure 32 at the rear portion thereof. The piercing structure 32 benefits heat dissipating of the storage server. Meanwhile, the chassis 30 may also have a connection interface 33 disposed at the rear portion thereof for connecting external components. For example, the connection interface 33 is an interface connecting the power supply 34 and an external power source.

In order to fasten the storage unit 203, a shell may be used to deploy on the surface of each storage unit 203 and then be fastened onto the bracket 209. Alternatively, a stop bar is disposed on the surface of each storage unit 203. The stop bar is connected to the bracket 209 so as to fasten the storage unit 203. Further, referring to FIG. 6, the bracket 209 also has a plurality of supporting stands 296 disposed at a bottom portion thereof. The supporting stands 296 are used to support the storage unit 203 for preventing the storage unit 203 from contacting the bracket 209. This benefits heat dissipating of the storage unit 203.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A storage server, suitable for installing in a case, the storage server comprising a chassis and at least one slide tray, the at least one slide tray located inside the chassis and being stacked and overlapped with each other, each slide tray being electrically connected to a power supply at a back end of the storage server via a first cable, the at least one slide tray comprising:
   at least one storage module disposed along two opposite sides of the slide tray and extended from a rear end to a front end of the slide tray, the storage module comprising:
      a storage backplane disposed on the slide tray; and
      two pairs of storage units back-to-back aligned with each other and electrically connected to the storage backplane, the respective storage unit being individually plugged into or pulled out from the storage backplane;
   at least one thermal dissipation module disposed at a front portion of the slide tray and located at a front end of the storage module;
   an transfer board disposed at a front portion of a channel located between the at least storage module at the two opposite sides of the slide tray, the transfer board being electrically connected to the storage backplane via a second cable and electrically connected to the thermal dissipation module via a third cable;

a circuit board plugged into or pulled out from the transfer board at a front end of the channel and electrically connected to the transfer board, the circuit board comprising at least one connector, the storage server expanding its storage capacity by interconnecting the at least one connector with each other, and the storage server being connected to an external server via the at least one connector for expanding a storage capacity of the external server; and a power backplane disposed at a rear portion of the channel and electrically connected to the storage units via a fourth cable.

2. The storage server according to claim 1, wherein the slide tray comprises two baffles disposed at two sides of the channel, for separating the storage modules at the two sides thereof, whereby the channel accommodates the second cable and the fourth cable.

3. The storage server according to claim 1, wherein the slide tray comprises a front window, the thermal dissipation module is located on an inner side of the front window, and the front window has a plurality of vents located corresponding to the thermal dissipation module.

4. The storage server according to claim 1, wherein the slide tray comprises two latch handles disposed on the two sides of the front portion of the slide tray, each of the latch handles comprises a shifting portion, a first fastening portion, and a handle portion, the chassis has a first opening hole relative to the first fastening portion, when the slide tray sliding into the chassis is at a first position, the first fastening portion is fixed to the first opening hole such that the slide tray is fastened in the chassis, when moving the shifting portion, the first fastening portion is linked to escape from the first opening hole, whereby the slide tray is removed from the chassis.

5. The storage server according to claim 1, wherein the chassis comprises a U-shaped handle and a spring plate, the spring plate has a second fastening portion, when the storage server slides into the case, the second fastening portion is fixed to a second opening hole of the case such that the storage server is fastened in the case, and when the spring plate is pressed or pushed, the second fastening portion of the spring plate escapes from the second opening hole such that the chassis is removed from the case.

6. The storage server according to claim 1, wherein the chassis has at least one damper fastened on two outer sides thereof and penetrating the chassis to form an interference with a slide rail at a lateral surface of the slide tray, whereby the slide tray slowly moves in or out from the chassis when the slide tray is pushed or pulled out from the chassis.

7. The storage server according to claim 6, wherein the damper is spaced apart from a front end of the chassis for a first distance.

8. The storage server according to claim 1, wherein the chassis comprises a partition plate disposed between the upper and lower slide trays and separating the chassis into two chambers so that the slide trays slide in or out from the chambers respectively, and the first cable is freely stretched at a bottom surface of the chamber when the slide tray slides in or out from the chamber.

* * * * *